(12) United States Patent
Bahl

(10) Patent No.: US 12,190,301 B2
(45) Date of Patent: Jan. 7, 2025

(54) METHOD AND SYSTEM FOR FACILITATING TRANSACTIONS VIA RECONSTRUCTABLE METALS

(71) Applicant: JPMorgan Chase Bank, N.A., New York, NY (US)

(72) Inventor: Ruchi Bahl, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/144,403

(22) Filed: May 8, 2023

(65) Prior Publication Data

US 2024/0320646 A1    Sep. 26, 2024

(30) Foreign Application Priority Data

Mar. 24, 2023    (IN) .............................. 202311021227

(51) Int. Cl.
*G06Q 20/18* (2012.01)
*G06Q 30/0201* (2023.01)

(52) U.S. Cl.
CPC ......... *G06Q 20/18* (2013.01); *G06Q 30/0206* (2013.01)

(58) Field of Classification Search
CPC .......................... G06Q 20/18; G06Q 30/0206
USPC ......................................................... 705/7.35
See application file for complete search history.

(56) References Cited

U.S. PATENT DOCUMENTS

2006/0052892 A1*   3/2006   Matsushima ........... G06F 30/00
                                                                   700/98
2018/0243993 A1*   8/2018   Shimizu ................. B33Y 50/02

\* cited by examiner

*Primary Examiner* — Zeina Elchanti
(74) *Attorney, Agent, or Firm* — GREENBLUM & BERNSTEIN, P.L.C.

(57) ABSTRACT

A method and system for facilitating transaction via a metal object, the metal object being made from a reconstructable metal, is disclosed. The method includes: receiving, at a transceiver, a transaction request that includes an amount of the transaction; receiving, at a metal object deposit portal, the metal object for the transaction; identifying, by processor, a current price rate of the reconstructable metal; determining, by the processor, a current price of the metal object based on weight of the metal object and the current price rate of the reconstructable metal; determining, by the processor, an amount of the reconstructable metal to be deducted from the metal object; and providing, by a dispenser, another metal object reconstructed from the metal object based at least on the amount of reconstructable metal to be deducted, to facilitate completion of the transaction.

6 Claims, 3 Drawing Sheets

METHOD AND SYSTEM FOR FACILITATING TRANSACTIONS VIA RECONSTRUCTABLE METALS

CROSS-REFERENCE TO RELATED APPLICATIONS

This application claims priority benefit from Indian Application No. 202311021227, filed on Mar. 24, 2023 in the India Patent Office, which is hereby incorporated by reference in its entirety.

BACKGROUND

Field of the Disclosure

This technology generally relates to payment solutions, and more particularly to methods and systems for using metal assets like Gold or Silver (in a metal biscuit or any ornamental form) to facilitate online trading or in-person payments.

Background Information

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

In today's world, where one has an option of using multiple currencies and along with the option to use these multiple currencies, there is an option of using cryptocurrencies. These options of using multiple currencies and cryptocurrencies provide people with several ways to manage their financial needs. For example, one may use a card such as a debit card or a credit card to make payments, or cash, or directly transfer an amount using unified payments interface (UPI), etc.

Along with the above options, one may think of making payments using precious metals such as Gold, Silver, etc. that people usually keep as a commodity. However, these metals as of now may only be used as commodities to sell or buy, but not to transact. Also, it is difficult for a person to sell a part of a metal while retaining remaining part of the same. Thus, at least for the above reasons, the precious metals are not used as a currency using which a person would be able to do transactions and buy things in market and use these precious metals to complete a transaction where a transaction amount of the transaction may be equal to an amount of a part of a precious metal being consumed.

Further, as value of metals may rise or fall as per market conditions, a usage of these metals in daily transactions may help people to earn profits if used smartly for payments. Also, this may simplify an exchange of such metals as in the currently existing procedures, one may use a metal only to get paid back a whole amount, equivalent to a value of the metal, in cash, in exchange.

For example, if one wants to earn profits from a dynamic value of these metals, one has to buy them on a day at which rates of these metals are low, and then either mortgage these metals in some bank or sell these metals at a jewelry shop on a day at which the rates are high, which is not an efficient way to trade.

Thus, there exists an imperative need in the art to provide a solution that focuses on designing a system and method which would enable people to trade these metals easily for day-to-day payments or larger purposes.

SUMMARY

The present disclosure, through one or more of its various aspects, embodiments, and/or specific features or sub-components, provides, inter alia, various systems, servers, devices, methods, media, programs, and platforms for performing day-to-day transactions using metals.

According to an aspect of the present disclosure, a method for facilitating a transaction via a first metal object is disclosed, where the first metal object is made from a reconstructable metal. The method may include receiving, at a transceiver, a transaction request that includes an amount of the transaction. Further, the method may include receiving, at a metal object deposit portal, the first metal object for the transaction. Further, the method may include identifying, by a processor, a current price rate of the reconstructable metal based on a metal type of the first metal object. The method may further include determining, by the processor, a current price of the first metal object based on a weight of the first metal object and the current price rate of the reconstructable metal. Further, the method may include determining, by the processor, an amount of the reconstructable metal to be deducted from the first metal object based on the current price of the first metal object and the amount of the transaction. Finally, the method may include providing, by a dispenser, a second metal object reconstructed from the first metal object, based at least on the amount of the reconstructable metal to be deducted, to facilitate completion of the transaction.

In accordance with an exemplary embodiment, the transaction is one from among an online transaction and an offline transaction.

In accordance with an exemplary embodiment, when the transaction is an online transaction, the method may further include: generating, by a server, a code including the metal type of the first metal object, the current price rate of the reconstructable metal, the amount of the reconstructable metal to be deducted from the first metal object, and the amount of the transaction; and syncing, by the server, the code via a blockchain mechanism.

In accordance with an exemplary embodiment, prior to the providing the second metal object, the method may further include: verifying, by the processor, the code via the blockchain mechanism, wherein the verifying the code results in one from among a successful verification of the code and an unsuccessful verification of the code.

In accordance with an exemplary embodiment, the providing the second metal object is further based on the successful verification of the code.

In accordance with an exemplary embodiment, prior to the determining the amount of the reconstructable metal to be deducted from the first metal object, the method may further include: comparing, by the processor, the amount of the transaction and the current price of the first metal object; and validating, by the processor, the transaction based on the comparison of the amount of the transaction and the current price of the first metal object, wherein the validating the transaction results in one from among a successful validation of the transaction and an unsuccessful validation of the transaction.

In accordance with an exemplary embodiment, the providing the second metal object is further based on the successful validation of the transaction.

According to another aspect of the present disclosure, a system for facilitating a transaction via a first metal object is disclosed, where the first metal object is made from a reconstructable metal. The system includes a transceiver configured to receive a transaction request that includes an amount of the transaction. Further, the system may include a metal object deposit portal connected to the transceiver, wherein the metal object deposit portal may be configured to receive the first metal object for the transaction. Further, the system may include a processor connected at least to the metal object deposit portal, wherein the processor may be configured to identify a current price rate of the reconstructable metal based on a metal type of the first metal object. Also, the processor may be further configured to: determine a current price of the first metal object based on a weight of the first metal object and the current price rate of the reconstructable metal; and determine an amount of the reconstructable metal to be deducted from the first metal object based on the current price of the first metal object and the amount of the transaction. The system may also include a dispenser connected at least to the processor, wherein the dispenser may be configured to provide a second metal object reconstructed from the first metal object, based at least on the amount of the reconstructable metal to be deducted, to facilitate completion of the transaction.

In accordance with an exemplary embodiment, the transaction is one from among an online transaction and an offline transaction.

In accordance with an exemplary embodiment, when the transaction is an online transaction, the system may further include a server, and the server may be configured to: generate a code including the metal type of the first metal object, the current price rate of the reconstructable metal, the amount of the reconstructable metal to be deducted from the metal object, and the amount of the transaction; and sync the code via a blockchain mechanism.

In accordance with an exemplary embodiment, prior to the providing the second metal object, the processor may be further configured to verify the code via the blockchain mechanism, wherein the verifying the code results in one from among a successful verification of the code and an unsuccessful verification of the code.

In accordance with an exemplary embodiment, the dispenser may be configured to provide the second metal object based on the successful verification of the code.

In accordance with an exemplary embodiment, prior to the determining the amount of the reconstructable metal to be deducted from the first metal object, the processor may be further configured to: compare the amount of the transaction and the current price of the first metal object; and validate the transaction based on the comparison of the amount of the transaction and the current price of the first metal object, wherein the validating the transaction results in one from among a successful validation of the transaction and an unsuccessful validation of the transaction.

In accordance with an exemplary embodiment, the dispenser may be further configured to provide the second metal object based on the successful validation of the transaction.

According to yet another aspect of the present disclosure, a non-transitory computer readable storage medium storing instructions for facilitating a transaction via a first metal object is disclosed, where the first metal object is made from a reconstructable metal. The instructions include executable code which, when executed by a processor, may cause the processor to: enable a transceiver to receive a transaction request that includes an amount of the transaction; enable a metal object deposit portal to receive the first metal object for the transaction; identify a current price rate of the reconstructable metal based on a metal type of the first metal object; determine a current price of the first metal object based on a weight of the first metal object and the current price rate of the reconstructable metal; determine an amount of the reconstructable metal to be deducted from the first metal object based on the current price of the first metal object and the amount of the transaction; and enable a dispenser to provide a second metal object reconstructed from the first metal object, based at least on the amount of the reconstructable metal to be deducted, to facilitate completion of the transaction.

In accordance with an exemplary embodiment, the transaction is one from among an online transaction and an offline transaction.

In accordance with an exemplary embodiment, when the transaction is an online transaction, the executable code, when executed by the processor, further causes the processor to: generate, via a server, a code including the metal type of the first metal object, the current price rate of the reconstructable metal, the amount of the reconstructable metal to be deducted from the first metal object, and the amount of the transaction; and sync, via the server, the code via a blockchain mechanism.

In accordance with an exemplary embodiment, prior to the enabling the dispenser to provide the second metal object, the executable code, when executed by the processor, further causes the processor to: verify the code via the blockchain mechanism, wherein the verifying the code results in one from among a successful verification of the code and an unsuccessful verification of the code.

In accordance with an exemplary embodiment, the providing the second metal object is further based on the successful verification of the code.

In accordance with an exemplary embodiment, prior to the determination of the amount of the reconstructable metal to be deducted from the first metal object, the executable code, when executed by the processor, further causes the processor to: compare the amount of the transaction and the current price of the first metal object; and validate the transaction based on the comparison of the amount of the transaction and the current price of the first metal object, wherein the validating the transaction results in one from among a successful validation of the transaction and an unsuccessful validation of the transaction.

In accordance with an exemplary embodiment, the providing the second metal object is further based on the successful validation of the transaction.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Figure 1:
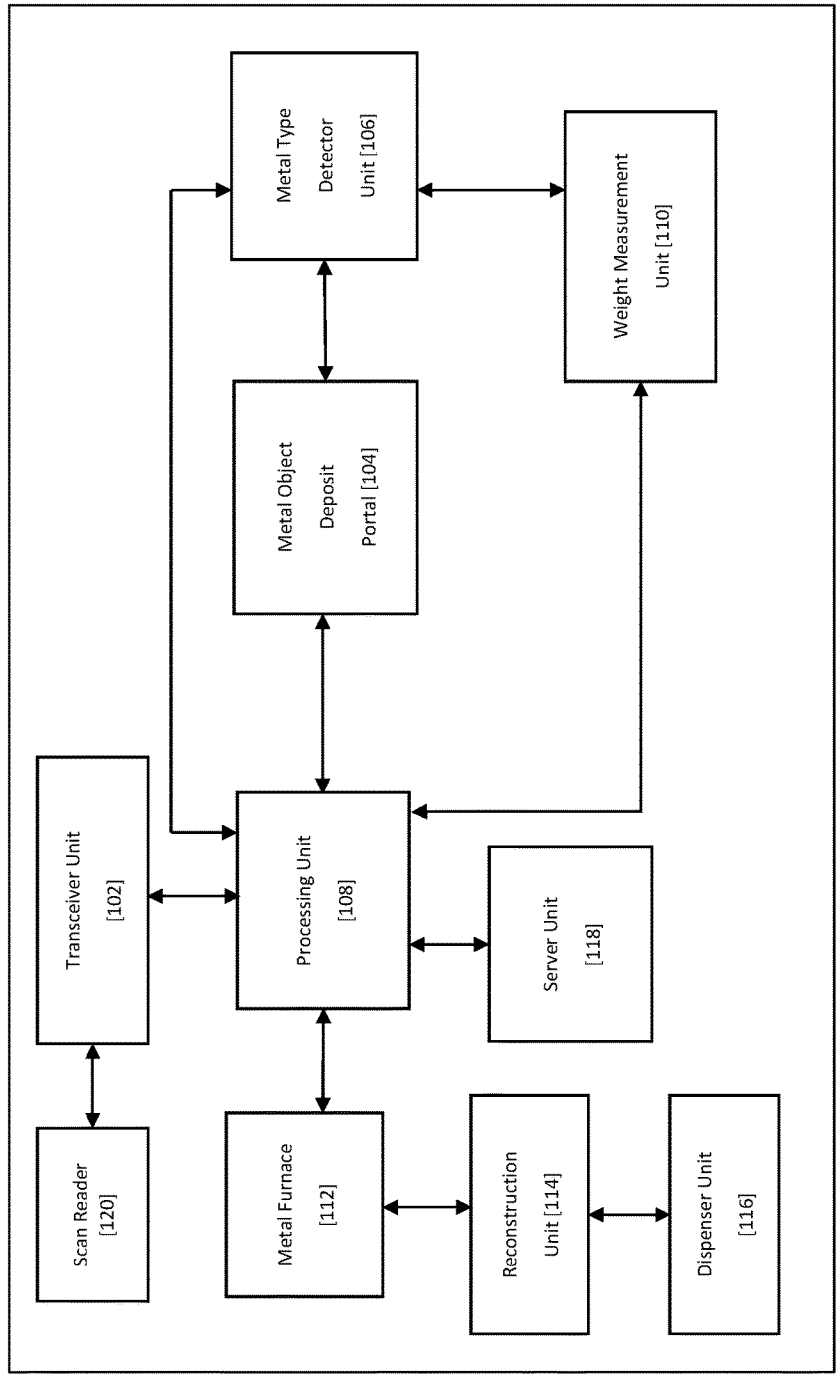
FIG. 1 illustrates an exemplary system 100 for facilitating a transaction via a metal object, in accordance with an exemplary embodiment of the present disclosure.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage medium having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

To overcome problems associated with facilitating day-to-day transactions via reconstructable metals, the present disclosure provides a method and a system for facilitating transactions via a metal object, the metal object being made from a reconstructable metal. The transactions may be performed by a user via online mode or offline mode. In the offline mode, the user may come over to, say a shop, to buy any item of his or her choice. Shopkeeper takes the metal object from the user and uses the device or system of the present invention to facilitate a transaction. Thereafter, a current price rate of the reconstructable metal based on a metal type of the metal object is identified using the system. Further, a current price of the metal object based on a weight of the metal object and the current price rate of the reconstructable metal is determined using the system. Further, an amount of the transaction is matched to the current price rate of the reconstructable metal. Also, the metal object is placed in the system and is first melted. The metal object is then reconstructed after deducting a payment price worth of molten metal. The metal object may be reconstructed to an original shape or design of the metal object or to a user desired shape or design or the system may choose a default shape or design, as applicable. User is then given the reconstructed metal object in a desired shape or design. In the online payment solution, the user may go to an online shop or trading platform to buy something. To make a payment, in payment options on such platform, the user may choose a payment type as "pay by metal" or any such suitable option. The user then receives a code identifying the payment. This code contains an information including the metal type of the metal object, its price rate at a time of booking a trade or buying, and the amount of the reconstructable metal to be deducted from the metal object to complete the payment. This information is saved in blockchain along servers. The user may then go to any metal exchange kiosk or the system as disclosed in the present disclosure. The code given to the user is scanned and a payment value is verified through blockchain servers. Once the payment value is verified, the user may be requested to provide the metal object to the system. The information is then verified and an amount of metal is reduced from the metal object as per the information in the code and the user is then provided the reconstructed metal object. Once this is done the user's transaction is called as complete and the user receives the reconstructed metal object accordingly.

Hereinafter, exemplary embodiments of the present disclosure will be described in detail with reference to the accompanying drawings so that those skilled in the art can easily carry out the present disclosure.

Referring to FIG. 1, an exemplary system 100 for facilitating a transaction via a metal object is shown, where the metal object is made from a reconstructable metal. The reconstructable metal may be any metal such as Gold, Silver, Copper, etc. as per the present disclosure. The system includes a transceiver unit 102 (also referred to herein as a "transceiver"), a metal object deposit portal 104, a processing unit 108 (also referred to herein as a "processor"), and a dispenser unit 116 (also referred to herein as a "dispenser"), all components of the system assumed to be operably connected with each other unless otherwise indicated in this disclosure. In an exemplary implementation, the system further includes a metal type detector unit 106 (also referred to herein as a "metal type detector"), a weight measurement unit 110 (also referred to herein as a "weight measurer"), a metal furnace 112, a reconstruction unit 114 (also referred to herein as a "reconstructor") and a server unit 118 (also referred to herein as a "server").

The transceiver unit 102 is configured to receive a transaction request that includes an amount of the transaction. The transaction may be performed by a user via online mode or offline mode. In an exemplary implementation, in event of an online transaction, the transceiver unit 102 is configured to receive the transaction request based on scanning of a code by the user at the system 100 via a scan reader 120. In an exemplary implementation, in an event of an offline transaction, the transceiver unit 102 is configured to receive the transaction request via an input provided by a merchant on the system 100. Also, the transceiver unit 102 may receive the transaction request by various means such as wired, wireless, encrypted code such as a quick response (QR) code, a database server hosted on internet, hashcode, etc. For this reason, the transceiver unit 102 may be located on a device implementing the system 100 of the present invention. For example, a person wants to buy a mobile phone worth 50,000 INR from a shop by making payment of 50,000 INR via a metal object that is made from a reconstructable metal, say for the purpose of this example, Gold. So, a transaction amount as received by the transceiver unit 102 is 50,000 INR. A person skilled in the art would appreciate that the above example is for understanding purposes only and does not limit the present disclosure in any possible manner.

Further, the metal object deposit portal 104 is connected to the transceiver unit 102. The metal object deposit portal 104 is configured to receive the metal object for the transaction. At the metal object deposit portal 104, some details related to the metal object are provided or calculated or verified.

For example, if the user is an online user, the user may provide details of a metal object that the user is going to use for the online transaction, such as a purity value of a reconstructable metal used to make the metal object, a weight of the metal object, etc. Also, in some cases, the online transaction may automatically get cancelled if the user does not come to scan a given code at a metal exchange kiosk in a provided time window or if a metal type or weight of the metal object is not as per the given code. For example, the user may provide that purity of Gold is 20 Carat and weight of the Gold is 5 grams. Now, in an exemplary implementation, in this example, when the user provides a physical form of the Gold, (i.e., a metal object) using which the user wishes to trade, at the metal exchange kiosk or the system 100 and details that the user fed do not match actual details determined by the system 100, the transaction is then declined. In another exemplary implementation, for example, if the purity of the Gold provided by the user is 20 Carat and weight of the Gold to be 5 grams. But actual weight calculated by the system 100 is 6 grams, then in this implementation, required amount of the Gold may still be deducted from the metal object made of the Gold provided by the user. A person skilled in the art would appreciate that the above example is for understanding purposes only and does not limit the present disclosure in any possible manner.

In another exemplary implementation, in an event of offline transaction, the user may provide details of a metal object that the user is going to use for the offline transaction, such as a purity value of a reconstructable metal used to make the metal object, a weight of the metal object, etc. or such details may be determined by the system 100 as explained further in this disclosure.

Further, in another exemplary implementation, the metal type detector unit 106 is connected at least to the metal object deposit portal 104. The metal type detector unit 106 is configured to identify the metal type of the metal object. For example, the metal object may be kept inside this metal type detector unit 106. The metal type detector unit 106, after performing its analysis of the metal object, may detect and inform via a user interface that which metal is kept inside the metal type detector unit 106, or a metal that is checked for is same as a metal used to make the metal object or not. For example, the user has input to the system 100 that the metal object provided to the metal type detector unit 106 is made of Gold. In this case, the metal type detector unit 106 may inform the user after its analysis that the metal object is made from the Gold or not. Techniques such as densiometric analysis, spectrometric analysis, etc. may be used to identify the metal type.

Further, the processing unit 108 is connected at least to the metal object deposit portal 104. The processing unit 108 is configured to identify a current price rate of the reconstructable metal based on the metal type of the metal object. In an exemplary implementation, the processing unit 108 is connected at least to the metal object deposit portal 104 and the metal type detector unit 106. After, the metal type of the metal object is confirmed, say for example, that the metal type is identified as Gold, then the processing unit 108 identifies the current price rate of the reconstructable metal based on the metal type of the metal object. For this purpose, the processing unit 108 may be connected to Internet to fetch the current price rate of the reconstructable metal. Alternatively, the current price rate of the reconstructable metal may be provided by the user via a user interface connected to the processing unit 108. Continuing with the above example, where the user or the person wants to buy a mobile phone worth 50,000 INR from a shop by making payment of 50,000 INR in exchange of Gold. Say, a current price rate of the Gold as identified by the processing unit 108 is 25,000 INR per gram. A person skilled in the art would appreciate that the above example is for understanding purposes only and does not limit the present disclosure in any possible manner.

Further, in an exemplary implementation, the weight measurement unit 110 is connected at least to the metal object deposit portal 104. The weight measurement unit 110 is configured to determine the weight of the metal object.

The weight measurement unit 110, in an exemplary implementation, may be operably coupled with the metal type detector unit 106 so as to generate complete information regarding the metal type and the weight of the metal object to be together provided to the user. Also, the weight measurement unit 110 may provide the weight of the metal object in various measurement units such as grams, kilograms, ounce, pound, etc. Continuing with the above example, where the user or the person wants to buy the mobile phone worth 50,000 INR from the shop by making payment of 50,000 INR in exchange of the Gold. Say, the user provides a Gold ornament, say a Gold ring to the system 100. Further, say a weight of the Gold ring as measured by the weight measurement unit 110 is 3 grams. A person skilled in the art would appreciate that the above example is for understanding purposes only and does not limit the present disclosure in any possible manner.

Also, the processing unit 108 is further configured to determine a current price of the metal object based on the weight of the metal object and the current price rate of the reconstructable metal. Now continuing with the above example, where the user or the person wants to buy the mobile phone worth 50,000 INR from the shop by making payment of 50,000 INR in exchange of the Gold, and the user provides the Gold ring of weight 3 grams, and the current price rate of the Gold is 25,000 per gram. Thus, for a payment of 50,000 INR through the Gold, the processing unit 108 determines that the user needs to pay or provide 2 grams of Gold. A person skilled in the art would appreciate that the above example is for understanding purposes only and does not limit the present disclosure in any possible manner. Further, the processing unit 108 is also configured to determine an amount of the reconstructable metal to be deducted from the metal object based on the current price of the metal object and the amount of the transaction. Thus, in this example, the processing unit 108 determines that 1 gram of the Gold needs to be returned to the user after deducting 2 grams of the Gold from the Gold ring of 3 grams.

Further, in an exemplary implementation, the system 100 includes the metal furnace 112 connected to the metal object deposit portal 104. The metal furnace 112 is configured to melt the metal object to generate a molten reconstructable metal. So, to extract a required amount of the reconstructable metal from the metal object, the metal object is first melted for the purpose of extracting exact amount of the reconstructable metal that is needed for a purpose of payment. Now continuing with the above example, where the user or the person wants to buy the mobile phone worth 50,000 INR from the shop by making payment of 50,000 INR in exchange of the Gold, and the user needs to pay 2 grams of the Gold to buy the mobile phone. Thus, the Gold ring of 3 grams is melted in the metal furnace 112. Out of this, 2 grams of the Gold is extracted, and 1 gram of the Gold needs to be returned to the user which is sent to the reconstruction unit 114 for reconstructing the same into an another object. A person skilled in the art would appreciate that the above example is for understanding purposes only and does not limit the present disclosure in any possible manner.

Further, in an exemplary implementation, the reconstruction unit 114, connected at least to the metal furnace 112, is configured to reconstruct a second object from the molten reconstructable metal based on the amount of the reconstructable metal to be deducted. That is, the reconstruction unit 114 receives the reconstructable metal in the molten form to reconstruct it in same shape as of an original metal object or in some other desired shape or design. In an exemplary embodiment, if an amount of molten metal after metal deduction is low and system 100 determines that same shape as of the original metal object cannot be maintained, the reconstruction unit 114 may reshape or reconstruct the molten metal in another shape or design. In another exemplary embodiment, the user may provide a desired shape or design as an input to the system 100 and the system 100 determines and reconstructs the metal in the user-desired shape or design, if possible. The system 100 may otherwise inform the user about choosing another shape or design from available options or the system 100 may proceed to choose a default shape or design for the user, etc. Thus, in an exemplary implementation, the reconstruction unit 114 is operably connected to the processing unit 114 in order to know the shape and design of the metal object. The reconstruction unit 114 reconstructs the molten metal into solid metal of the user-desired shape and design. Here, the metal object reconstructed is subjected to cooling so that it can be provided to the dispenser unit 116. Continuing with the above example, where the user wants to buy the mobile phone worth 50,000 INR from the shop by making payment of 50,000 INR in exchange of the Gold, and the user pays using the Gold ring of 3 grams out of which 1 gram of the Gold needs to be returned to the user. This 1 gram of the Gold is provided to the reconstruction unit 112 in molten form and is reconstructed into another object of a same shape as of the original metal object or different shape or design as selected by the user or as selected by default by the system 100. That is, this 1 gram of the Gold may be reconstructed in the shape of the Gold ring that the user originally provided, or it may be reconstructed in some other shape or design such as that of a brick (cuboidal), spherical, star, etc. This another metal object after cooling, is sent to the dispenser unit 116 to be dispensed to the user.

Finally, the dispenser unit 116 that is connected at least to the processing unit 108, is configured to provide the second metal object reconstructed from the original metal object, based at least on the amount of the reconstructable metal to be deducted from the original metal object, to facilitate completion of the transaction. Say in the above example, where the user wants to buy the mobile phone worth 50,000 INR from the shop by making payment of 50,000 INR in exchange of the Gold, the 1 gram of the Gold to be returned to the user is reconstructed into a Gold brick (of cuboidal shape) of 1 gram. Thus, the dispenser unit 116 would dispense the Gold brick of 1 gm in return to the user. A person skilled in the art would appreciate that the above example is for understanding purposes only and does not limit the present disclosure in any possible manner.

Also, in an exemplary implementation, in an event where the transaction is the online transaction, a code is generated by the server unit 118. This code is an encrypted code such as a quick response (QR) code, a database server hosted on Internet, hashcode, etc. In an exemplary implementation, the code is a hashcode provided to the user which is generated via a blockchain mechanism. The code includes information such as the metal type of the metal object, the current price rate of the reconstructable metal, the amount of the reconstructable metal to be deducted, and the amount of the transaction, wherein the code is synced by the server unit 118 via the blockchain mechanism. For example, say in the above example, the user has the Gold ring of 3 gm from which the user wants to buy the mobile phone worth 50,000 INR. But this time, the user performs an online transaction to buy mobile phone instead of visiting a shop. Thus, the user would perform an original transaction at a metal exchange kiosk or the system 100. Since, current price rate of Gold may fluctuate and vary time to time, the user, while performing the transaction, is provided with a code which has an information conforming to parameters at a time of transaction. For example, say at the time of the user making the transaction, a price rate of the Gold is determined by the system 100 to be 25,000 INR per gram of the Gold. At this time, all calculations related to the transaction, such as calculation of a price of metal object, etc. are made at this price rate of 25,000 INR per gram of the Gold. These calculations after being done, the required information is saved or linked with the code that is provided to the user for further verification and processing of the metal object at the metal exchange kiosk. Further, in this case, the user may be given a fixed pre-defined time window in which the user can visit the metal exchange kiosk, and deposit the Gold. For example, the user is provided with a period of 3 days to visit the metal exchange kiosk, and deposit the Gold. The price of such precious metal(s) fluctuates on daily basis, say in present example, the Gold price fluctuates in these 3 days. For a clear explanation, considering above exemplary case, where the user makes a transaction of 50,000 INR on Day 0 at the price of 25,000 INR per gram of the Gold at Day 0. In this exemplary implementation, say the user is provided with a time window of 3 days to deposit Gold ornament, e.g., the Gold ring at the metal exchange kiosk. At this time of making transaction, e.g., at Day 0, the user is given a code which contains a relevant transaction information, in this case, that the code may contain the price of 25,000 INR per gram of the Gold. For making transaction of 50,000 INR, total of 2 grams of the Gold should be deducted by the metal exchange kiosk. To complete the payment transaction, the user visits the metal exchange kiosk at Day 2 and the price of Gold at Day 2 increases to 26,000 INR per gram of the Gold. In this case, the "current price rate" of the Gold is considered to be 25,000 per gram only even if at the time of the user visiting the metal exchange kiosk, the current price rate of Gold has changed to 26,000 INR per gram. For further clarity, it should be noted that the "current price rate" here, is defined as the price rate of the reconstructable metal (Gold, in this example) at the time of the user performing the transaction. That is, the current price rate of the reconstructable metal gets locked or fixed for a time window provided to the user for completing the transaction. Thus, in the above exemplary scenario, once the user has made the transaction at Day 0 for 50,000 INR in exchange of Gold at the price of 25,000 INR per gram of the Gold, the code generated for the user contains an information that in case a verification of the information linked with the code is successful, 2 grams of the Gold should be deducted from the metal object e.g., the Gold ring provided by the user. Therefore, the amount of the Gold to be deducted is constant, e.g., 2 grams and does not fluctuate even if the current price rate of the Gold on Day 2 has fluctuated as compared with the current price rate of the Gold at Day 0 of making transaction by the user. This means that all calculations such as deduction of 2 grams of the Gold from the metal object (the Gold ring in this example), etc. are made using the information present in the code that is readable by the system 100.

Further, in an exemplary implementation, the processing unit 108 is configured to verify the code via the blockchain mechanism prior to melting the metal object to generate the molten reconstructable metal. This verification of the code results in one of a successful verification of the code and an unsuccessful verification of the code. The dispenser unit 116 provides the second metal object reconstructed from the original metal object, based on the successful verification of the code. In case the verification of the code results in the unsuccessful verification of the code, the dispenser unit 116 does not provide the second metal object reconstructed from the original metal object to the user.

Also, in an exemplary implementation, prior to determining the amount of the reconstructable metal to be deducted from the metal object based on the current price of the metal object and the amount of the transaction, the processing unit 108 is further configured to: compare the amount of the transaction and the current price of the metal object, and validate the transaction based on the comparison of the amount of the transaction and the current price of the metal object, wherein the validating the transaction results in one of a successful validation of the transaction and an unsuccessful validation of the transaction. The dispenser unit 116 may provide the second metal object reconstructed from the original metal object based on the successful validation of the transaction. In case the validating the transaction results in the unsuccessful validation of the transaction, the dispenser unit 116 does not provide the second metal object reconstructed from the original metal object to the user. Now, for example, a current price of a metal object is determined to be 40,000 INR and an amount of a transaction is 50,000 INR. This results in an unsuccessful validation of the transaction. Thus, the transaction is blocked in such case. And if, in an example, a current price of the metal object is determined to be 75,000 INR and the amount of the transaction is 50,000 INR, that results in a successful validation of the transaction and thus, the transaction would be facilitated. A person skilled in the art would appreciate that the above example is for understanding purposes only and does not limit the present disclosure in any possible manner.

Although the exemplary system 100 and its components are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

In addition, two or more computing systems, devices or units may be substituted for any one of the systems or devices in any example. Accordingly, principles and advantages of distributed processing, such as redundancy and replication also may be implemented, as desired, to increase the robustness and performance of the devices and systems of the examples.

Figure 2:
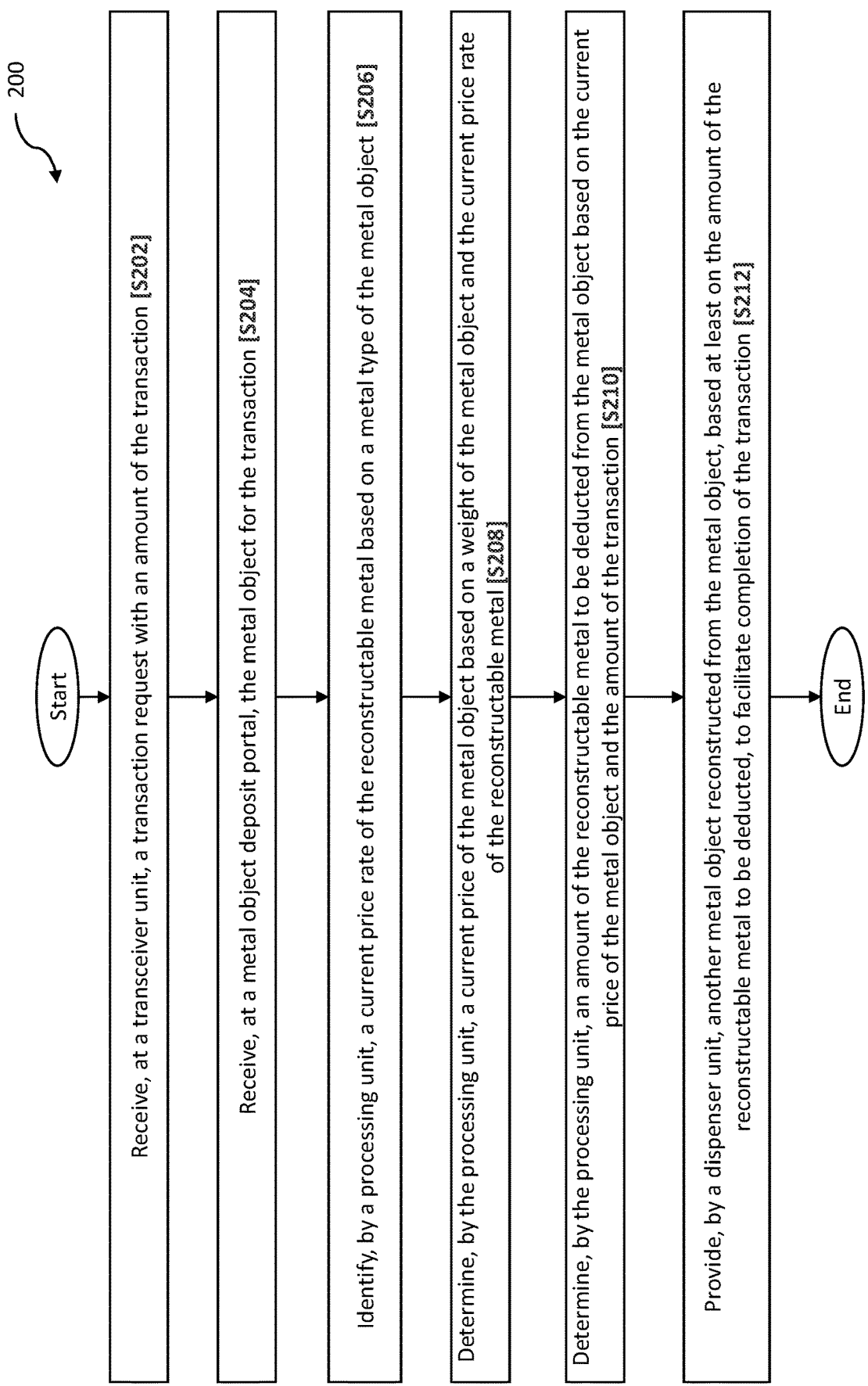
FIG. 2 is a flowchart of an exemplary process 200 for implementing a method for facilitating a transaction via a metal object, in accordance with an exemplary embodiment of the present disclosure.

Referring to FIG. 2, an exemplary method 200 for facilitating a transaction via a metal object, where the metal object is made from a reconstructable metal, is shown in accordance with exemplary embodiment of the present disclosure. As shown in FIG. 2, the method begins at step S202 upon receiving a transaction request. Thus, at step S202, the method includes receiving, at a transceiver unit 102, a transaction request with an amount of the transaction. The transaction request is made for facilitating the transaction using the metal object that is made from the reconstructable metal. The reconstructable metal may be any metal such as Gold, Silver, Copper, etc.

The transaction may be performed by the user via an online mode or an offline mode. Also, the transceiver unit 102 may receive the transaction request by various means such as wired, wireless, encrypted code such as a quick response (QR) code, a database server hosted on Internet, hashcode, etc. For this reason, the transceiver unit 102 may be located on a device implementing the system 100 of the present invention. In an exemplary implementation, in event of the online transaction, the transaction request may be received based on scanning of a code by the user at the system 100 via a scan reader 120. In an exemplary implementation, in an event of the offline transaction, the transaction request may be received via an input provided by a merchant on the system 100.

Further, at step S204, a metal object deposit portal 104 receives the metal object for the transaction. At the metal object deposit portal 104, some details related to the metal object are provided or calculated or verified. For example, if the user is an online user, the user may provide details of a metal object that the user is going to use for the online transaction, such as a purity value of a metal used to make the metal object, a weight of the metal object, etc. Also, in some cases, the online transaction may automatically get cancelled if the user does not come to scan a given code at a metal exchange kiosk in a provided time window or if a metal type or weight of the metal object is not as per the given code. Say, for example, the user may provide that purity of Gold is 20 Carat and weight of the Gold is 5 grams. Now, in an exemplary implementation, in this example, when the user provides a metal object made of the Gold at the metal exchange kiosk and details that the user fed do not match actual details determined by the system 100, the transaction is then declined. In another exemplary implementation, for example, if the purity of the Gold provided by the user is 20 Carat and weight of the Gold to be 5 grams. But actual weight calculated by the system 100 is 6 grams, then in this implementation, required amount of the Gold may still be deducted from the metal object made of the Gold provided by the user. A person skilled in the art would appreciate that the above example is for understanding purposes only and does not limit the present disclosure in any possible manner.

In another exemplary implementation, in an event of the offline transaction, the user may provide details of a metal object that the user is going to use for the offline transaction, such as a purity value of a reconstructable metal used to make the metal object, a weight of the metal object, etc. or such details may be determined by the system 100 as explained further in this disclosure.

In an exemplary implementation, a metal type detector unit 106 identifies the metal type of the metal object. The metal type detector unit 106 after performing its analysis of the metal object may detect and inform, via a user interface, that the metal object is made up of which metal type, or the metal type of the metal object is same as a metal type provided by the user or not. For example, the user has input to the system 100 that the metal object provided to the metal type detector unit 106 is made of Gold. In this case, the metal type detector unit 106 may inform the user after its analysis that the metal object is made from the Gold or not. Techniques such as densiometric analysis, spectrometric analysis, etc. may be used to identify the metal type.

Further, at step S206, a processing unit 108 identifies a current price rate of the reconstructable metal based on the metal type of the metal object. After, the metal object type is confirmed, then the processing unit 108 identifies the current price rate of the reconstructable metal based on the metal type of the metal object. For this purpose, the processing unit 108 may be connected to Internet to fetch the current price rate of the reconstructable metal. Alternatively, the current price rate of the reconstructable metal may be provided by the user via a user interface connected to the processing unit 108.

Further, in an exemplary implementation, a weight measurement unit 110 determines the weight of the metal object. The weight measurement unit 110 and the metal type detector unit 106 may disclose or provide complete information regarding the metal type of the metal object and the weight of the metal object together to the user, and not one by one. Also, the weight measurement unit 110 may provide the weight of the metal object in various measurement units such as grams, kilograms, ounce, pound, etc.

At step S208, the processing unit 108 determines a current price of the metal object based on the weight of the metal object and the current price rate of the reconstructable metal.

Further, at step S210, the processing unit 108 determines an amount of the reconstructable metal to be deducted from the metal object based on the current price of the metal object and the amount of the transaction.

Further, in an exemplary implementation, a metal furnace 112 melts the metal object to generate a molten reconstructable metal. To extract a required amount of metal from the metal object, the metal object is first melted for the purpose of extracting exact amount of the reconstructable metal that is needed for a purpose of payment.

Further, in an exemplary implementation, a reconstruction unit 114 reconstructs another object (i.e., a second metal object) from the molten reconstructable metal based on the amount of the reconstructable metal to be deducted. That is, the reconstruction unit 114 receives the reconstructable metal in the molten form to reconstruct it in same shape as of an original metal object or in some other desired shape or design. In an exemplary embodiment, if an amount of molten metal after metal deduction is low and system 100 determines that same shape as of the original metal object cannot be maintained, the reconstruction unit 114 may reshape or reconstruct the molten metal in another shape or design. In another exemplary embodiment, the user may provide a desired shape or design as an input to the system 100 and further the system 100 determines and reconstructs the metal object in the user-desired shape or design, if possible. The system 100 may otherwise inform the user about choosing another shape or design from available options or may proceed to choose a default shape or design for the user, etc. Thus, in an exemplary implementation, the reconstruction unit 114 knows via the processing unit 114, the shape and design of the metal object. The reconstruction unit 114 reconstructs the molten metal into solid metal of the user-desired shape and design. Here, the metal object reconstructed is subject to cooling so that it can be provided to a dispenser unit 116.

Finally, at step S212, the dispenser unit 116 provides the second metal object reconstructed from the original metal object, based at least on the amount of the reconstructable metal to be deducted from the original metal object, to facilitate completion of the transaction.

Figure 3:
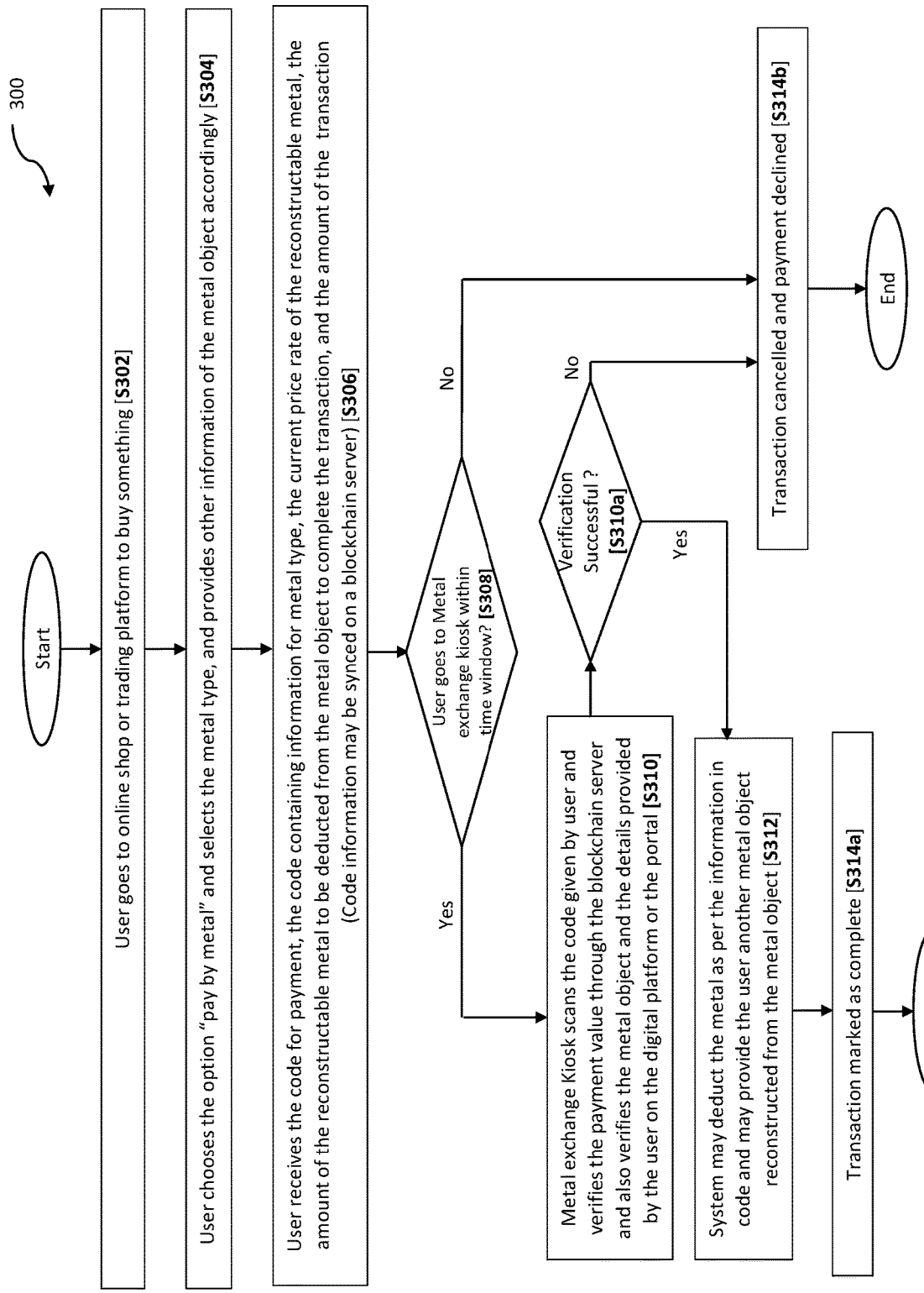
FIG. 3 is a flowchart of an exemplary process 300 for implementing a method for facilitating a transaction via a metal object in case of an online transaction, in accordance with an exemplary embodiment of the present disclosure.

For further clarity and understanding purposes, when the user performs the online transaction using the metal object as a payment option, the process is explained referring to FIG. 3. FIG. 3 illustrates an exemplary process 300 for implementing a method for facilitating a transaction via a metal object, the metal object is made from a reconstructable metal in case of the online transaction, in accordance with an exemplary embodiment. Wherever needed, features of FIG. 3 should be interpreted in light of the FIG. 2 as explained above.

As shown, at step S302, a user goes to an online shop or trading platform to buy something. At step S304, the user chooses an option "pay by metal" (or any such related or suitable option as may be indicated on a digital platform while making transaction) and selects a metal type, and provides other information of the metal object accordingly.

This is similar to step S204 of FIG. 2 where the transceiver unit 102 of the system 100 receives a transaction request.

Further, at step S306, the user receives a code for payment after providing certain details regarding the metal object that the user might be possessing. For example, the user here might input the certain details on the digital platform or portal about the metal type, weight of the metal object that the user has, a purity value of a reconstructable metal used to make the metal object and the like details. Here, the system 100 also fetches some dynamic details of the reconstructable metal such as a current price rate of the reconstructable metal at that particular moment of time when the user is making the transaction, etc. These details fetched by the system 100 along with the details provided by the user are saved in the system 100 and added to the code in their original form or after further processing, as needed. Thus, the code contains information for the metal type, the current price rate of the reconstructable metal, the amount of the reconstructable metal to be deducted from the metal object to complete the transaction, and the amount of the transaction. Further, this code information is also synced on a blockchain server for security purposes. Also, the user along with this, is given a time period say for example, a time window, to visit a metal exchange kiosk and deposit the metal object in its physical form to complete the transaction. At step S308, the method encompasses checking if the user has visited the metal exchange kiosk in the given time window. In a case where the user visits the metal exchange kiosk in the given time window, the process proceeds to step S310. In another case where the user does not visit the metal exchange kiosk in the given time window, the process proceeds to step S314b, and the transaction is cancelled automatically thereby ending the process in this case. However, in case the user visits the metal exchange kiosk in the given time window, then at step S310, the metal exchange kiosk scans the code (via a scan reader 120) given by the user and verifies a payment value through the blockchain server and also verifies the metal object and the details provided by the user on the digital platform or the portal. Further, at step S310a, it is identified if the verification done at the step S310 is a successful verification or not. If the details are correct in this step S310, the verification is successful, and the process goes to step S312 from step S310a. However, in case any of the details are not correct, the verification is unsuccessful, and the process goes to step S314b from step S310a. Further, the transaction is cancelled automatically as shown in step S314b. Pertinently, the steps of verification of the metal object with the code here also include the steps S204-S212 as explained in FIG. 2. That is, the verification includes matching of relevant transaction details present in the code with the details of the metal object deposited by the user at the metal exchange kiosk which also means that the metal exchange kiosk, in some implementations, includes at least some components similar to those of system 100 such as the metal object deposit portal 104, the metal type detector unit 106, the weight measurement unit 110, the metal furnace 112, the reconstruction unit 114, the dispenser unit 116, etc. Also, in an exemplary implementation, the metal exchange kiosk is able to perform all steps of the offline transaction and includes all components of system 100.

At step S312, the reconstructable metal is deducted as per the information in the code and the user is provided with another metal object (i.e., a second metal object) reconstructed from the original metal object, based at least on the amount of the reconstructable metal to be deducted, to facilitate completion of the transaction. Thus, after this, the transaction is marked as complete as shown in step S314a and the process ends. It will be appreciated by those skilled in the art that the FIG. 3 and the associated description is an example provided for the purposes of understanding and does not limit the scope of the invention in any manner.

As explained above, in an exemplary implementation, the method includes generation of a code, by the server unit 118, in an event where the transaction is the online transaction. This code is an encrypted code such as a quick response (QR) code, a database server hosted on internet, etc. In an exemplary implementation, the code is a hashcode provided to the user which is generated via a blockchain mechanism. The code includes information such as the metal type of the metal object, the current price rate of the reconstructable metal, the amount of the reconstructable metal to be deducted, and the amount of the transaction, wherein the code is synced by the server unit 118 via the blockchain mechanism. For example, the user performs the online traction to buy mobile phone and chooses an option of "pay by metal" or any such suitable option for the purposes of this disclosure. Thus, the user would perform an original transaction at a metal exchange kiosk. Since the current price rate of the reconstructable metal may fluctuate and vary time to time, the user while performing the transaction is provided with a hashcode which has an information conforming to parameters at a time of transaction. In this case, the user may be given a fixed pre-defined time window in which the user can visit the metal exchange kiosk, and deposit the metal object. Also, all calculations such as the amount of the reconstructable metal to be deducted from the metal object are made using the information present in this hashcode. In an exemplary implementation, in case the user does not visit the metal exchange kiosk and completes the transaction within a given time period, or the given time window, the transaction may get cancelled. Further, the processing unit 108, to facilitate completion of the transaction, verifies the code via the blockchain mechanism prior to the providing, by the dispenser unit 116, the another metal object reconstructed from the metal object, based on the amount of the reconstructable metal to be deducted. This verification of the code results in one of a successful verification of the code and an unsuccessful verification of the code. The providing, by the dispenser unit 116, the another metal object reconstructed from the metal object is further based on the successful verification of the code. In case the verification of the code results in the unsuccessful verification of the code, the dispenser unit 116 does not provide the another metal object reconstructed from the metal object to the user.

Also, in an exemplary implementation, prior to determining the amount of metal to be deducted from the metal object based on the current price of the metal object and the amount of the transaction at step S210 of FIG. 2, the processing unit 108 compares the amount of the transaction and the current price of the metal object, and validates the transaction based on the comparison of the amount of the transaction and the current price of the metal object, wherein the validating the transaction results in one of a successful validation of the transaction and an unsuccessful validation of the transaction. The dispenser unit 116 may provide the second metal object reconstructed from the original metal object based on the successful validation of the transaction. In case the validating the transaction results in the unsuccessful validation of the transaction, the dispenser unit 116 does not provide the second metal object reconstructed from the metal object to the user.

According to an aspect of the present disclosure, a non-transitory computer readable storage medium storing instructions for facilitating a transaction via a metal object is disclosed, where the metal object is made from a reconstructable metal. The instructions include executable code which, when executed by a processor, may cause the processor to: enable a transceiver unit to receive a transaction request with an amount of the transaction; enable a metal object deposit portal to receive the metal object for the transaction; identify a current price rate of the reconstructable metal based on a metal type of the metal object; determine a current price of the metal object based on a weight of the metal object and the current price rate of the reconstructable metal; determine an amount of the reconstructable metal to be deducted from the metal object based on the current price of the metal object and the amount of the transaction; and enable a dispenser unit to provide a second metal object reconstructed from the original metal object, based at least on the amount of the reconstructable metal to be deducted, to facilitate completion of the transaction.

In accordance with an exemplary embodiment, the transaction is one of an online transaction and an offline transaction. Also, in an event where the transaction is an online transaction, the executable code, when executed by the processor, further causes the processor to: generate, via a server unit, a code including the metal type of the metal object, the current price rate of the reconstructable metal, the amount of the reconstructable metal to be deducted from the metal object, and the amount of the transaction; and sync, via the server unit, the code via a blockchain mechanism.

In accordance with an exemplary embodiment, prior to the enabling the dispenser unit to provide the another metal object reconstructed from the metal object, based on the amount of the reconstructable metal to be deducted, the executable code, when executed by the processor, further causes the processor to: verify the code via the blockchain mechanism, wherein the verifying the code results in one of a successful verification of the code and an unsuccessful verification of the code. Further, in accordance with an exemplary embodiment, the second metal object reconstructed from the original metal object is provided by the dispenser unit further based on the successful verification of the code.

Also, in accordance with an exemplary embodiment, prior to the determination of the amount of the reconstructable metal to be deducted from the metal object based on the current price of the metal object and the amount of the transaction, the executable code, when executed by the processor, further causes the processor to: compare the amount of the transaction and the current price of the metal object; and validate the transaction based on the comparison of the amount of the transaction and the current price of the metal object, wherein the validating the transaction results in one of a successful validation of the transaction and an unsuccessful validation of the transaction. Further, in accordance with an exemplary embodiment, the second metal object reconstructed from the metal object is provided by the dispenser unit, further based on the successful validation of the transaction.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

Although the present application describes specific embodiments, certain aspects of which may be implemented as computer programs or code segments in computer-readable storage media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a metal object deposit portal, a first metal object, composed of a reconstructable metal, for a transaction;
   detecting with a metal-type detector the type of metal of which the first metal object is composed and outputting a signal to a processor representing the type of metal detected by the detector;
   weighing the first metal object with a scale, and outputting a signal representing the metal object's weight to the processor;
   validating with the processor at the deposit portal a process for dispensing of a second metal object reconstructed from a portion of the first metal object when melted, when the current price of metal reconstructed from melting of the first metal object is at least equal to the amount of the transaction, and canceling the process when the current price of metal reconstructed from melting of the first metal object is less than the amount of the transaction;
   melting, with a metal furnace, the first metal object to generate a molten reconstructable metal when the process is validated;
   extracting, when the process is validated, from the molten reconstructable metal an amount of reconstructable metal from the first metal object whose current price is equal to the amount of the transaction, the amount of reconstructable metal being determined by the processor based on the type of metal of the first metal object detected by the metal-type detector in the detecting operation and the weight of the first metal object determined by the scale;
   reconstructing a second metal object from the molten reconstructable metal remaining after the extracting operation when the process is validated; and
   dispensing with a dispenser, the second metal object reconstructed from the reconstructable metal remaining after the extracting operation when the process is validated.

2. The method as claimed in claim 1, wherein the method further comprises:
   generating, by the server, a code identifying the metal type of the first metal object, the weight of the first metal object, the current price rate of the reconstructable metal, the amount of the reconstructable metal to be deducted from the first metal object to reconstruct the second metal object, and the amount of the transaction; and
   syncing, by the server, the code via a blockchain mechanism,
   wherein the validating operation includes receiving the code, verifying that the type of metal identified in the code matches the type of metal detected by the detector, and verifying that the weight of the first metal object identified in the code matches the weight of the first metal object detected by the scale.

3. The method as claimed in claim 2,
   wherein the server sets a time window within which the receiving operation is to be performed, and
   wherein the validating operation further comprises
   validating the process when the receiving operation is performed within the time window, and canceling the process when the receiving operation is performed outside the time window, and
   verifying the code via the blockchain mechanism.

4. A non-transitory computer readable storage medium storing instructions for a processor in a system that also includes
   a metal object deposit portal receiving a first metal object composed of a reconstructable metal for a transaction,
   a metal-type detector detecting the type of metal of which the first metal object is composed and outputting a signal to the processor representing the type of metal detected by the detector,
   a scale weighing the first metal object, and outputting a signal representing the metal object's weight to the processor,
   a metal furnace configured to perform melting of the first metal object to generate a molten reconstructable metal, extracting from the molten reconstructable metal of an amount of reconstructable metal, and reconstructing of a second metal object from the molten reconstructable metal remaining after the extracting, and
   a dispenser dispensing the second metal object, the instructions comprising executable code which, when executed by the processor, causes the processor to:
   (a) enable the metal object deposit portal to receive the first metal object for a transaction;
   (b) permit the melting, extracting, reconstructing, and dispensing operations when the current price of metal reconstructed from melting of the first metal object is at least equal to the amount of the transaction; and
   (c) cancel the melting, extracting, reconstructing, and dispensing operations when the current price of metal reconstructed from melting of the first metal object is less than the amount of the transaction.

5. The storage medium as claimed in claim 4, wherein the executable code further causes the processor to:
   generate, via a server, a code identifying the metal type of the first metal object, the weight of the first metal object, the current price rate of the reconstructable metal, the amount of the reconstructable metal to be deducted from the first metal object to reconstruct the second metal object, and the amount of the transaction;
   sync, via the server, the code via a blockchain mechanism; and
   validate and permit the melting, extracting, reconstructing, and dispensing operations by verifying that the type of metal identified in the code matches the type of metal detected by the detector, and verifying that the weight of the first metal object identified in the code matches the weight of the first metal object detected by the scale.

6. The storage medium as claimed in claim 5, wherein
   the server sets a time window within which the receiving operation is to be performed,
   wherein the executable code instructs the processor to
   validate and permit the melting, extracting, reconstructing, and dispensing operations when the receiving operation is performed within the time window, and to cancel the process when the receiving operation is performed outside the time window, and
verify the code via the blockchain mechanism.

\* \* \* \* \*